United States Patent [19]

Sobue et al.

[11] Patent Number: 4,610,164

[45] Date of Patent: Sep. 9, 1986

[54] METHOD OF DETECTING LIQUID LEVEL

[75] Inventors: Hideo Sobue; Toshiharu Ito, both of Nagoya, Japan

[73] Assignee: NGK Spark Plug Co., Ltd., Japan

[21] Appl. No.: 742,188

[22] Filed: Jun. 7, 1985

[30] Foreign Application Priority Data

Jun. 20, 1984 [JP] Japan ............................ 59-128351

[51] Int. Cl.⁴ .............................................. G01F 23/28
[52] U.S. Cl. .................................... 73/290 V; 340/621
[58] Field of Search ...................... 73/290 V; 340/621

[56] References Cited

U.S. PATENT DOCUMENTS

| | | | |
|---|---|---|---|
| 3,079,596 | 2/1963 | Atkinson | 73/290 V X |
| 3,080,752 | 3/1963 | Rich | 73/290 V |
| 3,237,451 | 3/1966 | Haeff | 73/290 V X |
| 4,474,061 | 10/1984 | Parker | 73/290 V X |

Primary Examiner—Daniel M. Yasich
Attorney, Agent, or Firm—Darby & Darby

[57] ABSTRACT

An ultrasonic wave transmitter and an ultrasonic wave receiver are disposed in a tank in any positional relation to each other so long as the wave transmission and wave reception surface do not face each other to check whether the liquid level in the tank is above a predetermined level. When both the wave transmitter and wave receiver are submerged in the liquid in the tank, a wave radiated from the wave transmitter can be received by the wave receiver because of the facts that the directivity angle of the wave from the transmitter is large in the liquid and the wave propagates through the liquid without attenuation. When the liquid level decreases and becomes lower than either of the wave transmitters or wave receiver that is at an upper level, a wave from the transmitter can no longer be received by the receiver. This principle is utilized for the liquid level detection.

2 Claims, 8 Drawing Figures

FIG. I(A)
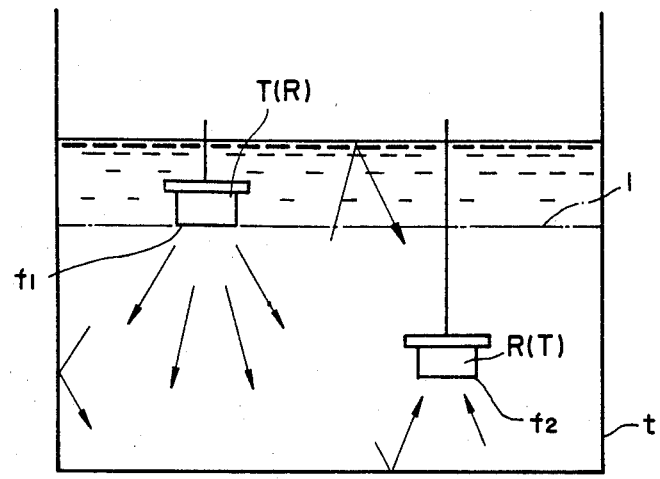
FIG. I(B)
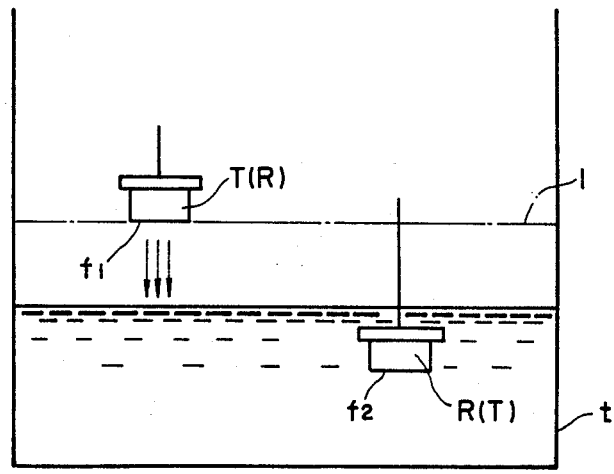

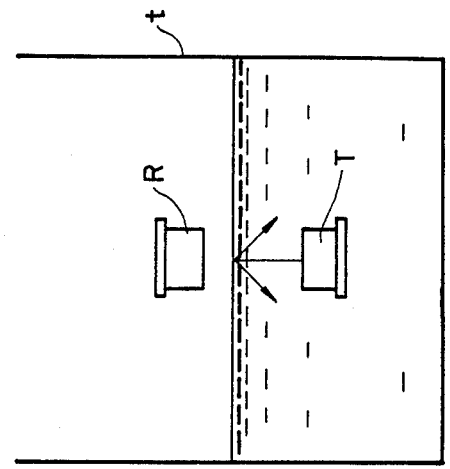
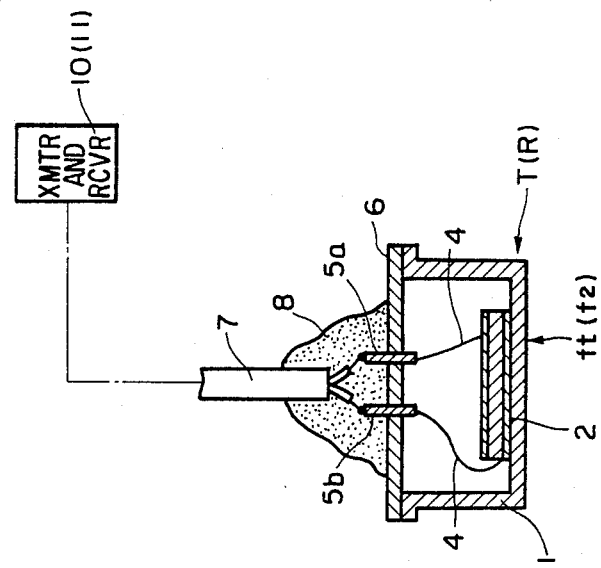

METHOD OF DETECTING LIQUID LEVEL

BACKGROUND OF THE INVENTION

1. Field of the Invention

This invention relates to a method of detecting a liquid level and, more particularly, to a liquid level detection method which checks whether the level of a liquid contained in a tank is above a predetermined level by making use of an ultrasonic wave.

2. Description of the Prior Art

As a pertaining method well known in the art, there is one, in which an ultrasonic wave transmitter and an ultrasonic wave receiver are disposed side by side in a tank and above a predetermined liquid level such that their wave transmission and wave reception surfaces face the liquid surface. The wave transmitter transmits an ultrasonic pulse wave, and the wave receiver receives the ultrasonic wave that is reflected by the liquid surface, whereby the time required until the transmitted wave reaches the wave receiver is measured. With this method, however, if there occurs a wave on the liquid surface, the ultrasonic pulse wave from the transmitter is reflected randomly so that it is not accurately transmitted to the receiver. Therefore, this method cannot be applied to the detection of the level of liquid subject to strong vibrations such as the liquid level in an automotive fuel tank.

To improve this drawback, there has been proposed a method disclosed in Japanese Patent Application Sho58-210285. As shown in FIG. 5, in this method a wave transmitter T and a wave receiver R are disposed above and below a predetermined liquid level such their respective wave transmission and wave reception surfaces face each other. When both the transmitter T and receiver R are submerged in the liquid, an ultrasonic pulse wave from the transmitter T is transmitted through the liquid to be received by the receiver R. When the liquid level is below a predetermined level so that the receiver R is in air above the liquid level, the ultrasonic pulse wave from the transmitter T is reflected by the liquid surface because the acoustic impedance of the liquid is very low compared to the acoustic impedance of air. In this case, therefore, the transmitted ultrasonic pulse wave cannot be received by the receiver R, so that it is possible to effect checking as to whether the liquid level is above a predetermined level.

In this method, however, the transmitter T and receiver R have to be disposed in the tank such that the wave transmission and wave reception surfaces accurately face each other, and their distance from each other has to be set in a predetermined relation to the wavelength of the ultrasonic pulse wave, e.g. to be equal to an integral multiple of the half wavelength of the wave propagated through the liquid. Their positioning, therefore, is very cumbersome. Besides, in the case of the automotive fuel tank as noted above, the tank experiences shocks with the running of the automobile, so that it is liable that the wave transmission and reception surfaces are inclined or that the transmitter and receiver are deviated from the regular positions. In such a case, failure of reception of the wave would result. Further, when the liquid level is lowered below the receiver R, i.e., when it is not present between the transmitter T and receiver R, the wave is no longer received, and this would yield the same decision as that the liquid level is at the predetermined level.

SUMMARY OF THE INVENTION

An object of the present invention is to provide a method of detecting a liquid level, which is free from the drawbacks discussed above.

According to the present invention, an ultrasonic wave transmitter T and an ultrasonic wave receiver R are disposed in a tank such that their respective wave transmission and wave reception surfaces do not face each other. When both the transmitter T and receiver R are submerged in the liquid in the tank, the ultrasonic wave radiated from the transmitter T can be received by the receiver R because the radiated wave has a wide directivity angle in the liquid and propagates through the liquid without attenuation. On the other hand, when the liquid level 1 in the tank becomes lower than the level of either transmitter T or receiver R that is located at an upper level, the radiated wave can no longer be received by the receiver R. In this way, it is possible to effect a check as to whether the liquid level is above a predetermined level 1.

The above-mentioned and other objects and features of the invention will become apparent from the following detailed description taken in conjunction with the drawings which indicate an embodiment of the invention.

BRIEF DESCRIPTION OF THE DRAWINGS

FIGS. 1A and 1B are longitudinal sectional views of a tank t with a wave transmitter T and a wave receiver R, with FIG. 1A showing a case when the liquid level in the tank t is above a predetermined level 1 and FIG. 1B showing a case when the liquid level is below the predetermined level 1;

FIG. 2 is a longitudinal sectional view showing an embodiment of the construction of the wave transmitter T or wave receiver R;

FIG. 5 is a longitudinal sectional view for explaining a prior art method.

DESCRIPTION OF THE PREFERRED EMBODIMENT

Figure 3B:
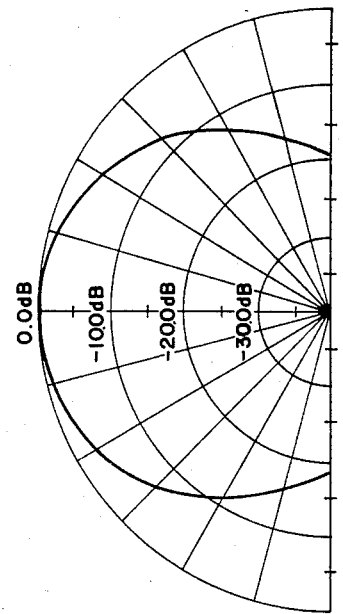
FIG. 3B is a graph showing attenuation corresponding to the same directivity angle of the same wave in air.
Figure 4B:
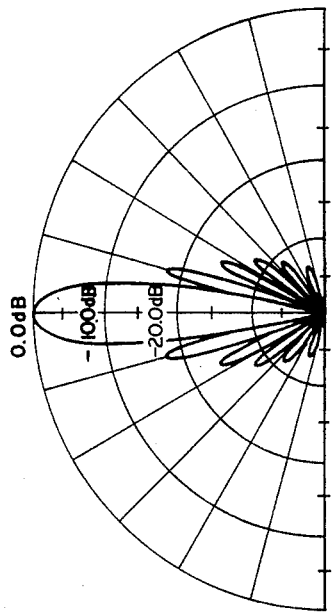
FIG. 4B is a graph showing the attenuation corresponding to the same directivity angle of the same wave in air.
Figure 3A:
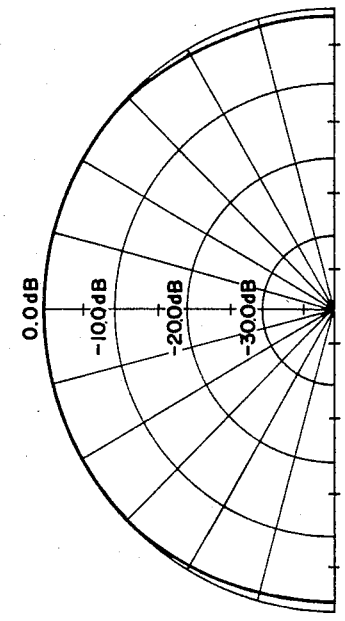
FIG. 3A is a graph showing attenuation corresponding to the directivity angle of a wave at 60.0 KHz in liquid.
Figure 4A:
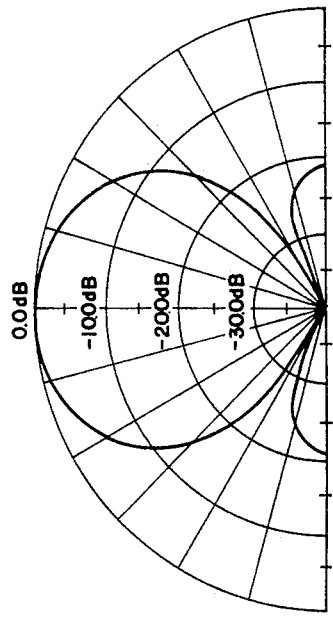
FIG. 4A is a graph showing the attenuation corresponding to the directivity angle of a wave at 300.0 KHz in liquid.

FIGS. 3A to 4B illustrate attenuation corresponding to the directivity angle of waves in water and in air. FIGS. 3A and 3B show the attenuation corresponding to a wave at 60.0 KHz, while FIGS. 4A and 4B show the attenuation corresponding to a wave at 300.0 KHz. As is obvious from the graphs, the attenuation does not occur so much in water unlike that in air even with a large directivity angle. Thus, it will be seen that the directivity angle of the wave from the wave transmitter T is large. Therefore, when the transmitter T and receiver R are both in water, the ultrasonic pulse wave from the transmitter T is radiated into a zone which is confined by the tank inner walls and liquid surface. Although the wave transmission and wave reception surfaces do not face each other, because of its large directivity angle the radiated wave repeatedly strikes and is reflected by the tank inner walls and liquid surface to be received by the receiver R.

When the transmitter T or receiver R that is at the upper level is in air for example as in FIG. 1B, the wave from the transmitter T cannot be received by the receiver R because the transmitter T and receiver R are disposed such that the wave transmission and wave reception surfaces do not face each other. More specifically, where the transmitter T is located in the upper level, when the liquid surface is found between the transmitter T and receiver R as shown in FIG. 1B, the radiated ultrasonic wave is reflected by the liquid surface and not transmitted through the liquid because the acoustic impedance of air is very high compared to the acoustic impedance of the liquid. When the liquid level is further lowered so that both the transmitter T and receiver R are found in air, the ultrasonic pulse wave radiated from the transmitter T is not incident on the receiver R because the directivity angle of the wave in air is small as shown in FIGS. 3B and 4B and the wave transmission surface of the transmitter T and wave reception surface of the receiver R do not face each other.

The same function as described above is obtained where the wave receiver R is at the upper level.

For this reason, assuming that the wave transmission surface (or wave reception surface) of the wave transmitter T (or wave receiver R) is submerged when the liquid level is at a predetermined level l, at a liquid level lower than the predetermined level l the ultrasonic pulse wave from the transmitter T cannot be received by the receiver R, so that it is possible to detect a decrease of the liquid level.

The transmitter T and receiver R may be disposed or skewed in any positional relation to each other so long as the wave transmission and wave reception surfaces do not face each other. This means that they may be at the same level, or both the wave transmission and wave reception surfaces may be directed downwards at different levels.

FIG. 2 shows a specific construction of the wave transmitter T or wave receiver R. The illustrated structure comprises a case 1 made of a metal or a plastic material. A piezoelectric element 2 with electrodes provided on the front and back sides is bonded to the inner bottom surface of the case 1. The top opening of the case 1 is sealed liquid-tight by a lid member 6, in which are embedded a pair of terminals 5a and 5b which are electrically connected by leads 4, 4 to the front and back electrodes of the piezoelectric element 2. A pair of leads exposed from an end of a cable 7 are connected to the terminals 5a and 5b, and the connected portions are covered by a water-proof paint 8.

While the wave transmitter T and wave receiver R have an identical construction, the transmitter T is connected to a signal transmission circuit 10 via the cable 7. In response to an oscillation signal from the signal transmission circuit 10, the transmitter T radiates an ultrasonic pulse wave from the outer bottom surface of the case 1, which serves as the wave transmission surface f1. The receiver R, on the other hand, is connected to a signal reception circuit 11 via the cable 7. It receives the ultrasonic pulse wave at the outer bottom surface of the case 1, which serves as the wave reception surface f2. The received wave is converted by the piezoelectric element 2 into an electric signal which is transmitted to the signal reception circuit 11.

In the arrangement shown in FIGS. 1A and 1B, the wave transmitter T and wave receiver R are disposed in the tank t with the transmitter T at an upper level and with the wave transmission and wave reception surfaces f1 and f2 not facing each other, i.e., directing downwards respectively. The wave transmission surface f1 is held at the predetermined liquid level l. The tank t may be either open or closed at the top.

In this embodiment, when the liquid level in the tank t is above the predetermined level l as shown in FIG. 1A, both the transmitter T and receiver R are found in the liquid. In this state, when an alternating voltage at a predetermined resonant frequency is applied to the piezoelectric element 2 of the transmitter T from the signal transmission circuit 10 which is disposed outside the tank t, the piezoelectric element 2 is oscillated in unison with the bottom of the case 1, whereby an ultrasonic pulse wave is radiated from the wave transmission surface f1. This pulse wave strikes the bottom wall of the tank t and, since the directivity angle of the wave from the transmitter T is large in the liquid, is diffused in various directions to be reflected by the side walls of the tank t. Further, since the acoustic impedance of air is very high compared to the acoustic impedance of the liquid, the wave is reflected by the liquid surface. In this way, the wave is propagated through every part of the liquid in the tank t to eventually strike the wave reception surface f2 of the receiver R. Thus, the wave reception surface f2 and piezoelectric element 2 of the receiver R are resonated, thus producing an output signal. This signal is detected by the signal reception circuit 11, whereby it is detected that the liquid level in the tank t is above the predetermined level l.

When the liquid level becomes lower than the predetermined level l to a position between the transmitter T and receiver R as shown in FIG. 1B, the transmitter T is exposed in air. In this case, since the ultrasonic wave from the transmitter T has a small directivity angle in air and also the radiated wave is reflected by the liquid surface, no wave is received by the receiver R. Thus, the signal reception circuit 11 detects no signal, whereby it is detected the liquid level is below the predetermined level l.

When the liquid level is further lowered so that both the transmitter T and receiver R are found in air, since the directivity angle of the ultrasonic pulse wave from the transmitter T is small in air, the ultrasonic pulse wave from the transmitter T is not incident on the receiver R at a spaced-apart position.

It should be noted that when the liquid level is above the predetermined level l, both the transmitter T and receiver R are submerged in the liquid, so that the generation of a wave on the liquid surface has no effect on the liquid level detection. In addition, the transmitter T and receiver R can be disposed in any positional relation to each other so long as the wave transmission and wave reception surfaces f1 and f2 do not face each other. Thus, they can be readily set in desired position and orientation. Further, the method according to the present invention is free from erroneous detection even when the tank t becomes empty as in the prior art case described before in connection with FIG. 5.

What is claimed is:

1. A method for detecting the level of liquid within a tank comprising the steps of:

positioning a first ultrasonic transducer within said tank in a given vertical plane at an intersecting horizontal plane coincident with a predetermined level, whereby when said liquid is at or above the predetermined level, the liquid immerses a receiving/transmitting face of said first ultrasonic transducer;

positioning a second ultrasonic transducer having a receiving/transmitting face within said tank in a lower horizontal plane and at a different vertical plane relative to the positioning of said first ultrasonic transducer, whereby the receiving/transmitting faces of said first and second ultrasonic transducers are substantially skewed from one another to the extent of their being outside the range of the relative directivity angle of the ultrasonic wave in air, thereby preventing any direct transmission and reception of ultrasonic waves therebetween;

operating one of said first and second ultrasonic transducers as a transmitter for transmitting ultrasonic waves, and the other as a receiver for receiving ultrasonic waves; and detecting the reception of ultrasonic waves from below the surface of and within said liquid by the one of said first and second ultrasonic transducers operating as a receiver, whereby the detection of ultrasonic waves indicates the liquid is at or above the predetermined level, and the absence of detected waves indicates the liquid is below the predetermined level.

2. A system for detecting the level of liquid in a tank being either at or above a predetermined level, or below the predetermined level, comprising:

a first ultrasonic transducer having a receiving/transmitting face positioned within said tank in the same horizontal plane as said predetermined level, said transducers being immersed in said liquid when the level of the liquid is at or above the predetermined level;

a second ultrasonic transducer having a receiving/transmitting face positioned in said tank below the predetermined level, the face of said second transducer being skewed from the face of said first transducer at least to the extent that when said first and second ultrasonic transducers are in air, no ultrasonic wave transmissions will pass therebetween;

means for operating one of said first and second ultrasonic transducers for transmitting ultrasonic waves, and the other for receiving ultrasonic waves; and detecting means for detecting the receipt of ultrasonic waves from below the surface of said liquid by the receiving one of said first and second ultrasonic transducers, the reception od ultrasonic waves being indicative of the liquid level in said tank being at or above the predetermined level, the non-reception of acoustic waves during a period of transmission of acoustic waves being indicative of the liquid being at a level below the predetermined level.

* * * * *